(12) United States Patent
Fries et al.

(10) Patent No.: US 6,848,617 B1
(45) Date of Patent: Feb. 1, 2005

(54) SMART CARD MODULE FOR BIOMETRIC SENSORS

(75) Inventors: Manfred Fries, Hunderdorf (DE); Jürgen Fischer, Deuerling (DE); Detlef Houdeau, Langquaid (DE)

(73) Assignee: Infineon Technologies AG, Munich (DE)

( * ) Notice: Subject to any disclaimer, the term of this patent is extended or adjusted under 35 U.S.C. 154(b) by 287 days.

(21) Appl. No.: 09/627,181

(22) Filed: Jul. 27, 2000

Related U.S. Application Data

(63) Continuation of application No. PCT/DE99/00139, filed on Jan. 20, 1999.

(30) Foreign Application Priority Data

Jan. 27, 1998 (DE) .......................................... 198 03 020

(51) Int. Cl.⁷ ............................................... G06K 19/06
(52) U.S. Cl. ........................ 235/492; 235/380; 235/382; 235/382.5; 235/487; 382/124
(58) Field of Search ................................ 235/492, 380, 235/382.5, 487, 375, 379; 382/124

(56) References Cited

U.S. PATENT DOCUMENTS

| | | | |
|---|---|---|---|
| 4,253,086 A | | 2/1981 | Szwarcbier |
| 4,980,802 A | | 12/1990 | Champagne et al. |
| 5,180,901 A | * | 1/1993 | Hiramatsu ................... 235/380 |
| 5,208,450 A | | 5/1993 | Uenishi et al. |
| 5,801,367 A | * | 9/1998 | Asplund et al. ............. 235/384 |
| 5,920,640 A | * | 7/1999 | Salatino et al. ............. 235/380 |
| 5,956,415 A | | 9/1999 | McCalley et al. |
| 6,012,636 A | * | 1/2000 | Smith .......................... 235/380 |
| 6,024,286 A | * | 2/2000 | Bradley et al. .............. 235/492 |
| 6,079,621 A | * | 6/2000 | Vardanyan et al. .......... 235/449 |
| 6,345,761 B1 | * | 2/2002 | Seelbach et al. ............ 235/380 |
| 6,360,953 B1 | * | 3/2002 | Lin et al. .................... 235/380 |

FOREIGN PATENT DOCUMENTS

| | | |
|---|---|---|
| DE | 196 18 144 C1 | 4/1997 |
| DE | 196 48 767 A1 | 6/1997 |
| EP | 0 343 030 | 11/1989 |
| EP | 0 484 353 B1 | 12/1993 |
| EP | 0 789 334 A2 | 8/1997 |
| FR | 2 746 201 | 9/1997 |
| JP | 1 152 590 | 6/1989 |
| JP | 1267097 | 10/1989 |
| JP | 2017690 | 12/1990 |
| JP | 9 171 547 | 6/1997 |
| JP | 9231346 | 7/1997 |
| WO | WO 96/42109 | 12/1996 |
| WO | WO 97/34252 | 9/1997 |

OTHER PUBLICATIONS

Published International Application No. WO 82/03286 (Löfberg), dated Sep. 30, 1982.

* cited by examiner

*Primary Examiner*—Michael G. Lee
*Assistant Examiner*—Ahshik Kim
(74) *Attorney, Agent, or Firm*—Laurence A. Greenberg; Werner H. Stemer; Ralph E. Locher

(57) ABSTRACT

In a smart card module for biometric sensors for installation in smart cards, a support has at least one through opening or window in the region of a sensor chip. The sensor chip is mounted on the support such that an active surface of the sensor chip is directed toward the support and is situated in the region of the window, so that it can be accessed through the window in the support.

8 Claims, 2 Drawing Sheets

SMART CARD MODULE FOR BIOMETRIC SENSORS

CROSS-REFERENCE TO RELATED APPLICATION

This is a continuation of copending International Application PCT/DE99/00139, filed Jan. 20, 1999, which designated the United States.

BACKGROUND OF THE INVENTION

Field of the Invention

The invention relates to a smart card module for biometric sensors used in smart cards.

In areas in which unambiguous identification of people is important, increasing use is being made of sensors that operate using biometric methods and are able to recognize individual biological features of a person, for example a fingerprint. By way of example, fingerprint sensors may be used to check the access authorization of a person in security areas in banks, research laboratories, military facilities etc., with the result of the check governing whether or not access to rooms, computers etc. is enabled.

It is known practice to use as fingerprint sensors sensor chips which are disposed on appliances or walls such that a finger can be applied. Furthermore, smart cards in the form of entry authorization cards or banking machine cards are known which, in conjunction with a secret number to be entered, permits a door to be opened or permits access to a bank account. However, such smart cards do not operate with biometric sensors and do not satisfy the highest demands for security against unauthorized use.

The use of a fingerprint sensor in a card-like body is proposed in Published, European Patent EP 0 789 334 A, corresponding to U.S. Pat. No. 5,862,248.

SUMMARY OF THE INVENTION

It is accordingly an object of the invention to provide a smart card module for biometric sensors that overcomes the above-mentioned disadvantages of the prior art devices of this general type, which is able to be used for installation in smart cards.

With the foregoing and other objects in view there is provided, in accordance with the invention, a smart card module for biometric sensing to be installed in a smart card. The smart card module contains at least one sensor chip functioning as a sensor and having an active surface; and a support selected from the group consisting of board-shaped supports and foil-shaped supports. The support has electrically conductive regions connected to the sensor chip and to electrical connections of the smart card. The support further has at least one opening formed therein. The sensor chip is mounted on the support such that the active surface of the sensor chip is directed toward the support and is situated in a region of the opening so that the active surface can be accessed through the opening.

In the case of the smart card module according to the invention, the sensor chip is mounted on a board-like or foil-like support that has electrically conductive regions connected to the sensor chip, on the one hand, and to electrical connections of the smart card, on the other hand. The support has at least one through window in the region of the sensor chip. Furthermore, the sensor chip is mounted on the support such that the active structure of the sensor chip is directed toward the support and is situated in the region of the window, so that it can be accessed through the window in the support.

The smart card module according to the invention enables biometric sensor chips to be installed in smart cards. This allows the security of conventional smart cards to be increased further. The smart card is usually inserted into a reader far enough for the window with the sensor chip to be still freely accessible. The smart card module then receives from the reader the power required for recording the fingerprint, with the sensor chip passing the data, if appropriate, to a semiconductor chip which is likewise integrated in the smart card and serves as an evaluation device. Such smart cards may be in the form of both contactless and contacted smart cards. In the case of contactless smart cards, the power and the data are supplied by inductive/capacitive coupling.

A particularly advantageous feature is that, in the same way as is customary in smart card technology, the smart card module according to the invention can be ready-mounted and tested on the assembly line and can be inserted into the prepared smart card only as part of a completing work operation. For insertion into the smart card, customary mounting technology may be used, as is used for so-called combi chip modules, i.e. for simultaneously contactless and contacted chip modules. The electrical operation of the sensor chip or of the entire chip module can be tested before actual insertion into the smart card. Integration in the manufacturing process is accordingly simple and economic.

According to one advantageous embodiment, the sensor chip is subdivided into a plurality of individual segments that are each situated in the region of a dedicated window in the support. Splitting the sensor chip into a plurality of individual segments has the advantage that the risk of breakage is significantly reduced for the relatively large and consequently breakage-prone sensor chip required in the case of a fingerprint sensor.

Advantageously, the smart card module is bonded to the smart card material in the edge regions of the support by a flexible adhesive. This allows the harmful influence of smart card bending stresses on the smart card module to be reduced.

According to one expedient embodiment of the invention, at least some of the electrically conductive regions of the smart card module between the electrical connections of the smart card and the sensor chip contain conductor tracks routed in a meander shape. Such conductor tracks routed in a meander shape afford an appropriate degree of flexibility so that bending stresses in large-area sensor chips can be absorbed without the electrical connections being damaged.

Other features which are considered as characteristic for the invention are set forth in the appended claims.

Although the invention is illustrated and described herein as embodied in a smart card module for biometric sensors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
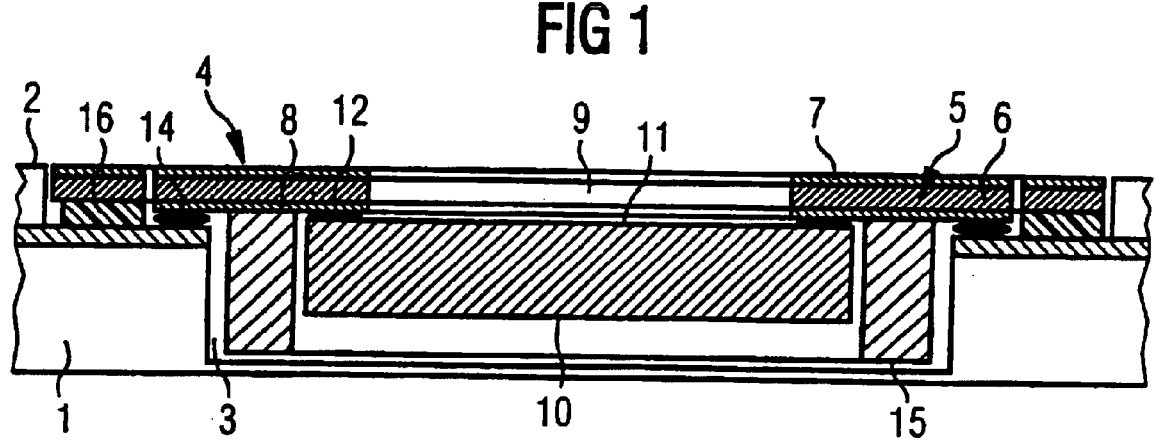
FIG. 1 is a diagrammatic, cross-sectional view of a smart card module inserted into an appropriate depression in a smart card according to the invention.

In all the figures of the drawing, sub-features and integral parts that correspond to one another bear the same reference symbol in each case. Referring now to the figures of the drawing in detail and first, particularly, to FIG. 1 thereof, there is shown a detail of a smart card 1 having a depression 3 which is made in its surface 2 and into which a smart card module 4 is inserted.

The smart card module 4 has a board-like or foil-like support 5 that is made of an epoxy layer 6, an upper conductive layer 7 and lower conductive regions 8. In the center of the support 5, there is a through cutout 9 that forms a rectangular window 9.

Disposed on the underside of the support 5 is a sensor chip 10 that has an upper active surface 11. The active surface 11 is in the form of a sensor surface which is able to recognize a fingerprint of a finger applied to the active surface 11 and is able to pass the structure of the fingerprint to an evaluation unit (not shown in more detail) in the form of electrical pulses. The sensor chip 10 is somewhat larger than the window 9 and is disposed immediately below the window 9, so that the active surface 11 is directed toward the window 9, and the sensor chip 10 can be mounted on edge regions of the support 5 next to the window 9. Electrical connections of the sensor chip 10 are connected to associated conductive regions 8 of the support 5 via chip contact points 12, these chip contact points 12 being situated in the edge region next to the window 9. The smart card module 4 and conductor tracks 13 of the smart card 1 are electrically connected by external connections 14 situated between the conductor tracks 13 of the smart card 1 and the conductive regions 8 of the smart card module 4.

In addition, situated between the external connections 14 and the chip contact points 12 there is a stiffening element 15 in the form of a stiff ring that is placed onto the support 5 from below.

The entire smart card module 4 is permanently bonded by a flexible adhesive 16 in a raised edge region of the depression 3. The flexible adhesive 16 has a sufficient flexibility and thickness to allow it to yield appropriately when the smart card 1 is bent. This prevents the relatively stiff smart card module 4 and, in particular, the sensor chip 10 from being damaged.

Figure 3:
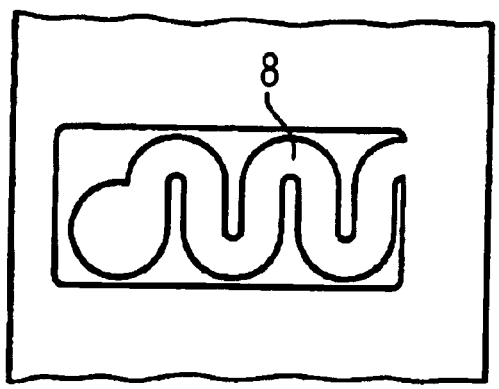
FIG. 3 is a plan view of a conductor track which is routed in a meander shape and extends from an external connection of the smart card module to a sensor chip.

To prevent appropriate bending stresses from being transmitted from the external connections 14 via the conductive regions 8 to the chip contact points 12, and from there to the sensor chip 10, it is possible for the conductive regions 8 to be configured as conductor tracks 8 running in a meander shape, an example of the conductor tracks 8 being shown in a plan view in FIG. 3.

Figure 2:
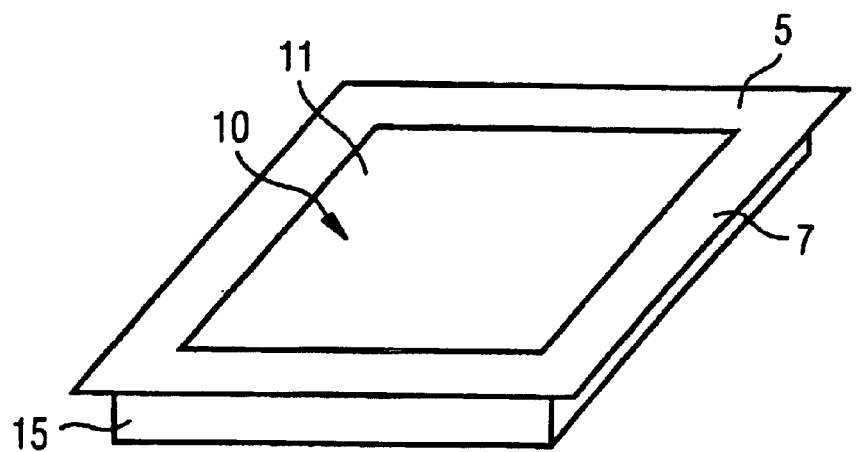
FIG. 2 is a perspective view of the smart card module obliquely from above.

FIG. 2 shows a schematic, perspective view of the smart card module 4 from FIG. 1. The upper conductive layer 7 forms a ground frame surrounding the window 9. In this illustrative embodiment, a single window 9 is provided in the support 4, the window 9 being large enough to be able to record an entire fingerprint.

Figure 4:
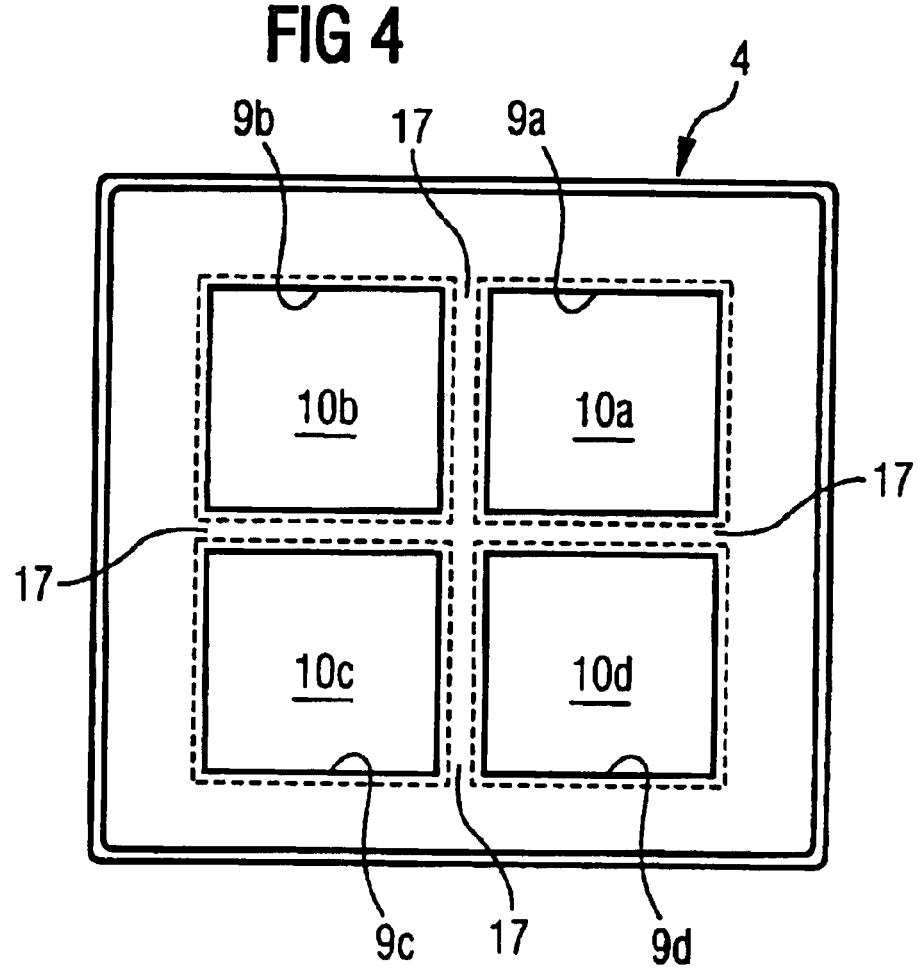
FIG. 4 is a plan view of the smart card module having the sensor chip subdivided into four individual segments and having a support that has four corresponding windows.

FIG. 4 shows a schematic plan view of an alternative embodiment of the invention, in which the sensor chip 10 is subdivided into four segments 10a, 10b, 10c, 10d. In the illustrative embodiment shown, the segments 10a, 10b, 10c, 10d are square and of equal size, their outer contours being shown by dashed lines.

When such a quartered sensor chip 10a–d is used, the window 9 in the support 5 is also quartered, i.e. the window 9 has four individual windows 9a, 9b, 9c, 9d which are likewise square and are disposed such that they produce a large square overall. The individual windows 9a, 9b, 9c, 9d are isolated from one another by webs 17 of the support 5, which together form a central cross. The webs 17 serve to mount the segments 10a, 10b, 10c, 10d of the sensor chip 10. The segmentation of the sensor chip 10 ensures that the sensor chip 10 has a certain degree of flexibility, so that the risk of breakage when the smart card 1 is bent is reduced.

If a finger is applied to the window segments 9a, 9b, 9c, 9d, the fingerprint lines, which can be recorded only disjointedly on account of the webs 17, are completed electronically, so that a fingerprint can be evaluated in the same way as if the webs 17 were not present.

We claim:

1. In combination with a smart card, a smart card module for biometric sensing installed in the smart card, the smart card module comprising:

at least one sensor chip functioning as a sensor and having an active surface; and a support selected from the group consisting of board-shaped supports and foil-shaped supports, said support having electrically conductive regions connected to said sensor chip and to electrical connections of the smart card, said support having at least one opening formed therein, said sensor chip mounted on said support such that said active surface of said sensor chip is directed toward said support and situated in a region of said opening so that said active surface can be accessed through said opening.

2. The smart card module according to claim 1, wherein said opening is one of a plurality of openings formed in said support, and said sensor chip is subdivided into a plurality of individual sensor segments which are each situated in a region of one of said openings in said support.

3. The smart card module according to claim 1, wherein said support has end regions, and including a flexible adhesive disposed at said end regions for mounting said support to the smart card.

4. The smart card module according to claim 1, wherein at least some of said electrically conductive regions disposed between the electrical connections of the smart card and said sensor chip contain conductor tracks routed in a meander shape.

5. A smart card for biometric sensing, comprising:

a smart card body;

electrical connections disposed on said smart card body; and a smart card module mounted on said smart card body, said smart card module including:

at least one sensor chip functioning as a sensor and having an active surface; and a support selected from the group consisting of board-shaped supports and foil-shaped supports, said support having electrically conductive regions connected to said sensor chip and to said electrical connections, said support having at least one opening formed therein, and said sensor chip mounted on said support such that said active surface of said sensor chip is directed toward said support and situated in a region of said opening so that said active surface can be accessed through said opening in said support.

6. The smart card according to claim 5, wherein said opening is one of a plurality of openings formed in said support, and said sensor chip is subdivided into a plurality of individual sensor segments which are each situated in a region of one of said openings in said support.

7. The smart card module according to claim 5, wherein said support has end regions, and including a flexible adhesive disposed at said end regions for mounting said smart card module to said smart card body.

8. The smart card module according to claim 5, wherein at least some of said electrically conductive regions disposed between said electrical connections and said sensor chip contain conductor tracks routed in a meander shape.

* * * * *